(12) United States Patent
Ahmad

(10) Patent No.: US 7,876,464 B2
(45) Date of Patent: Jan. 25, 2011

(54) COMBINED INTERFACE FOR SPECIFYING SEPARATE CHARACTERISTICS FOR MULTIPLE COPIES OF AN ELECTRONIC DOCUMENT

(75) Inventor: Athar L. Ahmad, Redmond, WA (US)

(73) Assignee: Ricoh Company, Ltd., Tokyo (JP)

( * ) Notice: Subject to any disclaimer, the term of this patent is extended or adjusted under 35 U.S.C. 154(b) by 1262 days.

(21) Appl. No.: 11/343,453

(22) Filed: Jan. 30, 2006

(65) Prior Publication Data

US 2007/0177164 A1 Aug. 2, 2007

(51) Int. Cl.
*G06F 3/12* (2006.01)

(52) U.S. Cl. ............ 358/1.15; 358/1.12; 358/1.13

(58) Field of Classification Search ............ None
See application file for complete search history.

(56) References Cited

U.S. PATENT DOCUMENTS

| | | | | |
|---|---|---|---|---|
| 5,949,417 A * | 9/1999 | Calder | ............ | 715/788 |
| 6,337,745 B1 * | 1/2002 | Aiello et al. | ............ | 358/1.15 |
| 6,405,222 B1 * | 6/2002 | Kunzinger et al. | ............ | 715/205 |
| 6,431,772 B1 * | 8/2002 | Melo et al. | ............ | 400/70 |
| 6,456,386 B1 * | 9/2002 | Watanabe et al. | ............ | 358/1.12 |
| 6,748,183 B2 * | 6/2004 | Edmonds | ............ | 399/23 |
| 6,781,709 B2 * | 8/2004 | Nozawa | ............ | 358/1.12 |
| 6,809,831 B1 * | 10/2004 | Minari | ............ | 358/1.15 |
| 6,850,335 B1 * | 2/2005 | Barry et al. | ............ | 358/1.15 |
| 6,985,245 B1 * | 1/2006 | Takahashi | ............ | 358/1.15 |
| 6,988,728 B2 * | 1/2006 | Kida | ............ | 271/292 |
| 7,148,978 B1 * | 12/2006 | Mori | ............ | 358/1.15 |
| 7,170,614 B1 * | 1/2007 | Matsuura et al. | ............ | 358/1.12 |
| 7,227,663 B1 * | 6/2007 | Yu | ............ | 358/1.15 |
| 7,724,384 B2 * | 5/2010 | Hwang et al. | ............ | 358/1.13 |
| 2002/0080376 A1 * | 6/2002 | Momose et al. | ............ | 358/1.9 |
| 2002/0191205 A1 * | 12/2002 | Stringham | ............ | 358/1.13 |
| 2003/0011812 A1 * | 1/2003 | Sesek et al. | ............ | 358/1.15 |

\* cited by examiner

*Primary Examiner*—Mark K Zimmerman
*Assistant Examiner*—Dung D Tran
(74) *Attorney, Agent, or Firm*—Hickman Palermo Truong & Becker LLP

(57) ABSTRACT

A method for specifying handling characteristics for multiple printed copies of an electronic document is disclosed. According to one aspect, a user interface is displayed. The user interface comprises user interface elements through which a user can specify, for each copy of two or more printed copies of an electronic document, a separate handling characteristic (e.g., a source tray and/or an output tray) for that copy. The handling characteristics for each copy of the electronic document may differ. Through the user interface, separate handling characteristics for each copy of the two or more copies are received. Print data, which causes the printing device to print the two or more copies in accordance with the handling characteristics, in sent to a printing device (e.g., a printer). Consequently, users are not required to repetitively activate the "print" control of an application program for each copy that is to be handled differently.

14 Claims, 4 Drawing Sheets

Copies: [20] 302

| Copies: | Source: | OutPut: |
|---|---|---|
| Copy 11: | Tray 1 ▶ | Mail Box 1 ▶ |
| Copy 12: | Tray 2 ▶ | Mail Box 3 ▶ |
| Copy 13: | Tray 1 ▶ | Mail Box 1 ▶ |

COMBINED INTERFACE FOR SPECIFYING SEPARATE CHARACTERISTICS FOR MULTIPLE COPIES OF AN ELECTRONIC DOCUMENT

FIELD OF THE INVENTION

The invention relates to printing devices, and more specifically, to a technique for specifying separate characteristics for each copy of multiple copies of an electronic document, through a user interface.

BACKGROUND OF THE INVENTION

Printing devices, such as printers, copy machines, and multi-function peripherals (MFPs) such as the Ricoh Aficio Color 6513 system, sometimes have multiple source trays and multiple output trays (also called "mailboxes"). Each source tray may contain sheets of media of a different type. For example, a first source tray might contain paper of one size and/or color, a second source tray might contain paper of another size and/or color, and a third tray might contain sheets of non-paper media, such as transparency sheets.

Printing device users often find it useful to print multiple copies of an electronic document. Typically, to print multiple copies of a document, a user activates a "print" control in the user interface of the application in which the document is currently loaded. In response, the application invokes a printer driver. The printer driver displays an interface that allows the user to specify how many copies of the document the user wants to print. If the printing device through which the document is to be printed has multiple source trays and/or output trays, then the interface may allow the user to specify a single source tray and a single output tray. When the copies of the document are printed, all of the copies are printed on media from the specified source tray, and all of the copies are deposited in the specified output tray.

There are many times when users find it beneficial to print one copy of a document on one type of media, and another copy of that same document on another type of media. Similarly, there are many times when users find it beneficial to have separate printed copies of the same document deposited into different output trays. For example, a user might want to print a first copy of a document on white paper from a first source tray, a second copy of that document on yellow paper from a second source tray, and a third copy of that document on pink paper from a third source tray. The user might want the first copy to be deposited in a first output tray, the second copy to be deposited in a second output tray, and the third copy to be deposited in a third output tray. After all of the copies have been printed, the user may distribute each copy to a different person or organization.

Unfortunately, when a user wants to do something like this, it is not very easy for the user to do so. As is discussed above, interfaces displayed by existing printer drivers at most only allow the user to choose one of several input trays and one of several output trays for all of the copies of a document. Therefore, if a user wants to print multiple copies of a document on sheets of media from separate input trays, the user is required to activate the "print" control of an application multiple times. For example, if the user wanted to print a first copy of a document on white paper from a first source tray, a second copy of that document on yellow paper from a second source tray, and a third copy of that document on pink paper from a third source tray, then the user would need to (1) invoke the printer driver a first time, specifying that a single copy of the document should be printed on white paper from the first source tray, (2) after sending the first copy to the printing device, invoke the printer driver a second time, specifying that a single copy of the document should be printed on yellow paper from the second source tray, and (3) after sending the second copy to the printing device, invoke the printer driver a third time, specifying that a single copy of the document should be printed on pink paper from the third source tray.

If a user needs to print many copies of a document in this manner, the user may become irritated with the repetitive nature of the actions he is required to perform. Using existing techniques, for example, if a user wanted to print twenty different copies of the same document using media from twenty different input trays, then the user would need to activate the "print" control of an application twenty separate times, and tell the printer driver, twenty different times, to print a single copy of the document.

Based on the foregoing, there is a need for a technique that allows users to specify, through a combined user interface, separate source trays and/or output trays for separate copies of the same electronic document.

SUMMARY OF THE INVENTION

A method for specifying handling characteristics for multiple copies of an electronic document is disclosed. According to one aspect, a user interface is displayed. The user interface comprises user interface elements through which a user can specify, for each copy of two or more copies of an electronic document, a separate handling characteristic (e.g., a source tray and/or an output tray) for that copy. The handling characteristics for each copy of the electronic document may differ. Through the user interface, separate handling characteristics for each copy of the two or more copies are received. Print data, which causes the printing device to print the two or more copies in accordance with the handling characteristics, in sent to a printing device (e.g., a printer).

BRIEF DESCRIPTION OF THE DRAWINGS

Embodiments are illustrated by way of example, and not by way of limitation, in the figures of the accompanying drawings in which like reference numerals refer to similar elements and in which:

FIG. 3 is a block diagram that depicts a portion of an example combined user interface through which a user can access a custom page-defining user interface, according to an embodiment of the invention.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

Figure 1:
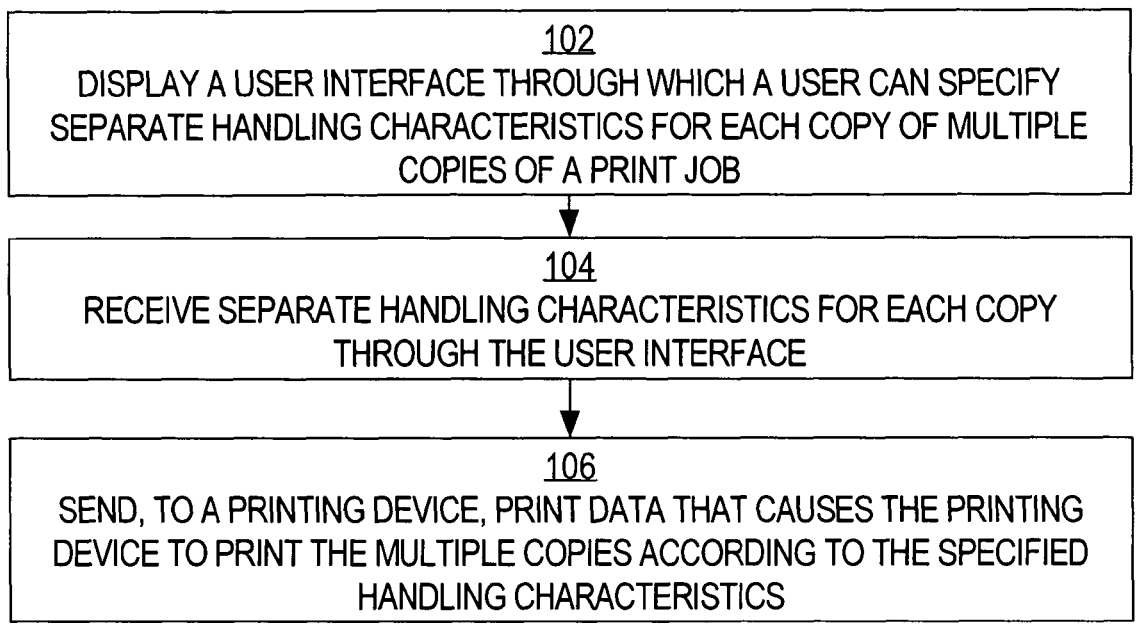
FIG. 1 is a flow diagram that depicts an overview of a technique for specifying, through a single combined user interface, different handling characteristics for multiple copies of an electronic document, according to an embodiment of the invention.

FIG. 1 is a flow diagram that depicts an overview of a technique for specifying, through a single combined user interface, different handling characteristics for multiple copies of an electronic document, according to an embodiment of the invention. For example, a printer driver that acts as an intermediary between application programs and a printing device may perform the technique depicted.

In block 102, a user interface is displayed. The user interface comprises user interface elements through which a user can specify, for each copy of two or more copies of an electronic document, a separate handling characteristic (e.g., a source tray and/or an output tray) for that copy. According to one embodiment, a "handling characteristic" is any action that a printing device can perform on or relative to a printed copy of an electronic document. According to one embodiment, a "handling characteristics" is any action that a printing device performs during the processing of an electronic document. As used herein, "handling characteristics" include "finishing options." The handling characteristics for each printed copy of the electronic document may differ. For example, in response to a user's activation of a "print" control in an application program, a printer driver may display, to the user, a user interface such as that described below with reference to FIG. 3.

In block 104, through the user interface, separate handling characteristics for each copy of the two or more copies are received. For example, a user may specify, through the user interface, how many copies of an electronic document are to be printed. In response to the user's specification of the number of copies, the user interface may present to the user a separate set of user interface elements for each copy. For example, if there are to be two copies, then the user interface may display, within the same dialog box, (a) a first set of user interface elements that allow the user to specify a source tray and/or an output tray for the first copy, and also (b) a second set of user interface elements that allow the user to specify a potentially different source tray and/or a potentially different output tray for the second copy. Because the sets of user interface elements for all of the copies are displayed within the same user interface (e.g., dialog box), the user is not required to repetitively activate the "print" control of an application program for each copy that is to be handled differently than the other copies.

In block 106, print data, which causes the printing device to print the two or more copies in accordance with the specified handling characteristics, in sent to a printing device such as a printer, a copy machine, or a multi-function peripheral (MFP) such as the Ricoh Aficio Color 6513 system. The printing device receives the print data and prints the two or more copies in accordance with the specified handling characteristics. For example, if the user specified that a first copy was to be printed with media drawn from a first source tray of the printing device, and that a second copy was to be printed with media drawn from a second source tray of the printing device, then the printing device prints the two copies accordingly.

In different embodiments of the invention, print data sent to the printing device can be separated into multiple print jobs or combined into a single print job. In one embodiment of the invention, separate print data that represents each copy of an electronic document to be printed is sent to a printing device as a separate print job; each print job can specify different handling characteristics. In one embodiment of the invention, a single set of print data that represents all copies of an electronic document to be printed is sent to a printing device as a single print job; in this case, the print job specifies the different handling characteristics for all of the copies that are to be printed.

Example System

Figure 2:
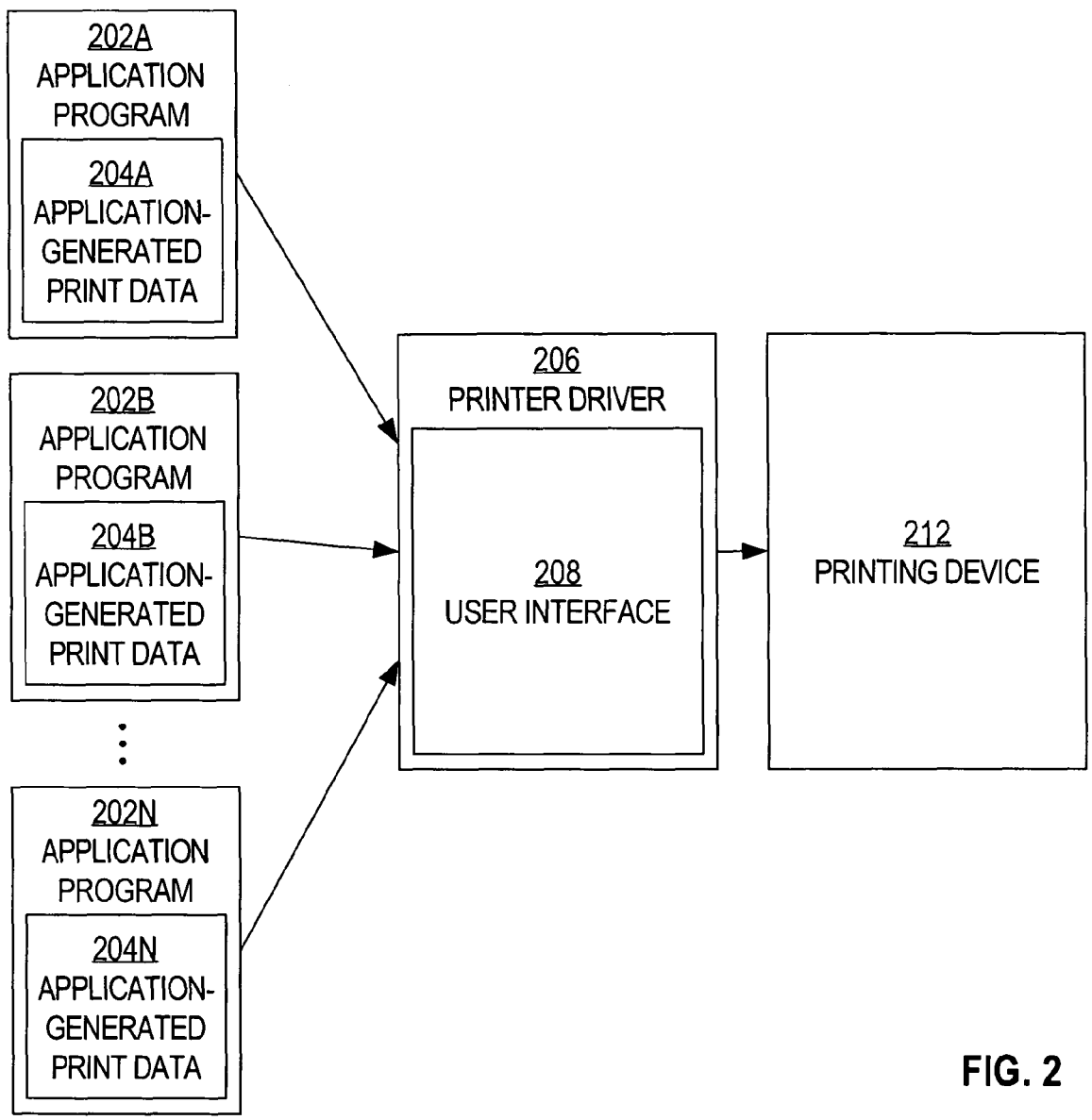
FIG. 2 is a block diagram that depicts an example system in which a printer driver is configured to display a single combined user interface through which different handling characteristics for multiple copies of an electronic document may be specified, according to an embodiment of the invention.

FIG. 2 is a block diagram that depicts an example system in which a printer driver is configured to display a single combined user interface through which different handling characteristics for multiple copies of an electronic document may be specified, according to an embodiment of the invention. The technique described above with reference to FIG. 1, and other techniques described herein, may be performed within the system depicted in FIG. 2.

The system depicted in FIG. 2 comprises several application programs 202A-N. Applications programs 202A-N may execute on the same or different computer systems. Application programs 202A-N may differ from each other. Each of application programs 202A-N generates corresponding application-generated print data 204A-N. The print data generated by each application program may differ from the print data generated by the other application programs. For example, application 202A might be a word processor that generates print data that represents pages of a document, and application 202B might be a digital image editor that generates print data that represents an image.

Typically, each of application programs 202A-N has some print mechanism, such as a "print" menu item or a visual control such as an icon that looks like a printer, that, when activated by a user, causes that application program to invoke printer driver 206. Thus, each of application programs 202A-N may invoke the same printer driver 206. Because the functionality of printer driver 206 can be invoked by any of application programs 202A-N in one embodiment of the invention, none of application programs 202A-N needs to separately implement the custom header/footer/separator page generating functionality that printer driver 206 implements.

Printer driver 206 may reside on the same or on different computer systems as the computer systems on which applications 202A-N reside. Printer driver 206 may be a modified version of a Microsoft Windows printer driver, for example. Printer driver 206 may be especially designed to serve as an interface between a particular operating system and the particular kind of printing device that is printing device 212. Different printer drivers may exist for different printing devices. Each such printer driver may implement the functionality described below.

When printer driver 206 is invoked, programmatic code contained within printer driver 206 displays user interface 208 to a user of the application program that invoked the print mechanism. User interface 208 may comprise multiple user-selectable controls that pertain to printing data. Some specific examples of user interface 208 are described further below. According to one embodiment of the invention, among the controls displayed within user interface 208 are controls that allow a user to specify, for each copy of two or more copies of the same electronic document, separate and potentially different handling characteristics such as (a) a source tray for that copy, and (b) an output tray for that copy.

Printer driver 206 sends, toward printing device 212, print data that causes printing device 212 to print the specified copies of the electronic document according to the handling characteristics specified through user interface 208. Printing device 212 may be a printer, a copy machine, or a multi-function peripheral (MFP) such as the Ricoh Aficio Color 6513 system, for example. Printing device 212 typically is separate from the computer system on which printer driver 206 resides; printer driver 206 may send the print data toward printing device 212 through a network or a printer cable, for example. Upon receiving the print data, printing device 212 prints copies of the electronic document according to the specified handling characteristics.

Example Combined User Interface

As is described above with reference to block 102 of FIG. 1, in one embodiment of the invention, a user interface is displayed to a user. The user interface comprises user interface elements through which a user can specify, for each copy of two or more copies of an electronic document, a separate handling characteristic (e.g., a source tray and/or an output tray) for that copy. For example, as is described above with reference to FIG. 2, when printer driver 206 is invoked, programmatic code contained within printer driver 206 displays user interface 208 to a user of an application program that invoked a print mechanism.

FIG. 3 is a block diagram that depicts a portion of an example combined user interface through which a user can access a custom page-defining user interface, according to an embodiment of the invention. The user interface is "combined" because it combines, into one interface, user interface elements that allow handling characteristics for multiple copies of the same electronic document to be specified. In one embodiment of the invention, the portion of the user interface depicted in FIG. 3 is displayed within the user interface that printer driver 206 displays to a user when printer driver 206 is invoked.

With reference to FIG. 3, the user interface comprises a number of copies field 302 and sets of user interface elements 304A-N. In field 302, a user enters a number of copies of an electronic document that are to be printed. For example, a user might specify, through field 302, that 20 copies of a particular document are to be printed.

In one embodiment of the invention, in response to the entry of a number in field 302, a separate set of user interface elements 304A-N is displayed for each copy. Such sets may be displayed within the same dialog box as the dialog box that contains field 302, for example. It is not necessary that all of the sets of user interface elements be displayed simultaneously; for example, a "scroll bar," as shown in FIG. 3, may be used to display various sets of user interface elements 304A-N at any given time. In FIG. 3, for example, sets of user interface elements for Copies 11, 12, and 13 of an electronic document are currently displayed within the user interface, while those sets of user interface elements associated with the other 17 of the 20 copies are not currently displayed.

In FIG. 3, sets of user interface elements 304A-N comprise, for each copy to be printed, a "source" drop-down menu and an "output" drop-down menu. Using these drop-down menus, a user can specify separate source trays and output trays for each copy that is to be printed. For example, a user might specify that "Copy 11" of the electronic document is to be printed on media drawn from "Tray 1" and then deposited into "Mailbox 1" of the printing device, and the user might additionally specify that "Copy 12" of the same electronic document is to be printed on media drawn from "Tray 2" and then deposited into "Mailbox 2." Because each tray may contain different types of media, different copies of the electronic document may be printed of different types of media (e.g., different colors and/or sizes of paper).

According to one embodiment of the invention, after a user has specified handling characteristics for all of the copies of the electronic document that are to be printed in a batch of copies, the user clicks an "OK" button control of the user interface. In response, the printer driver sends, to the printing device, print data for all of the copies of the electronic document. The print data indicates the specified handling characteristics for each copy to be printed.

Although handling characteristics such as source tray and output tray are discussed specifically above, various embodiments of the invention may allow a user to specify, in a similar manner, characteristics other than those specifically discussed above. For example, in one embodiment of the invention, the combined user interface may allow a user to specify, for each copy of an electronic document, whether that copy is to be stapled, punched, bound, printed in color or black and white, etc.

Implementation Mechanisms

Figure 4:
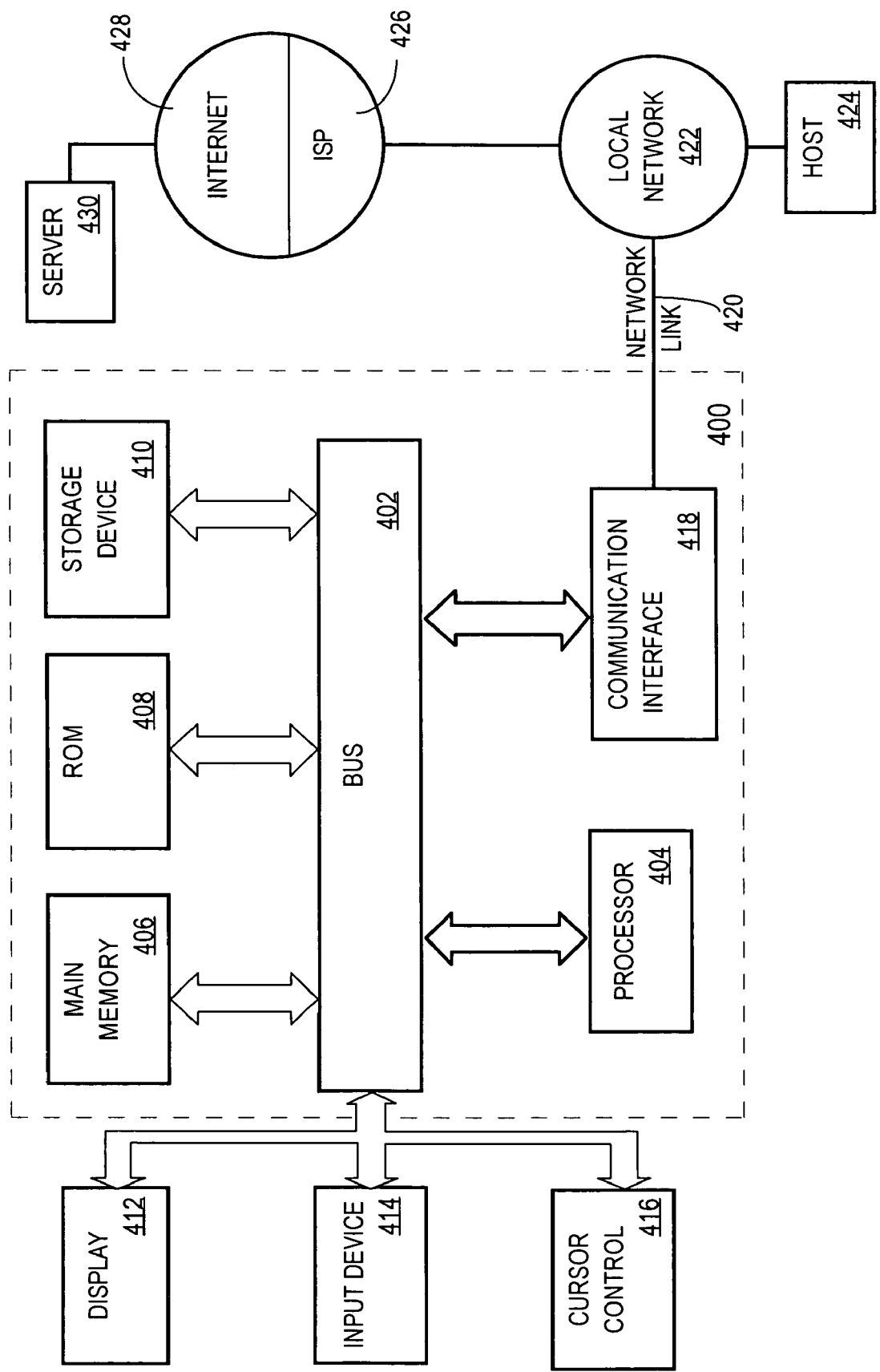
FIG. 4 is a block diagram that depicts a printing device upon which an embodiment of the invention may be implemented.

FIG. 4 is a block diagram that depicts a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), for displaying information to a user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 in a wireless communications architecture. According to one embodiment of the invention, wireless communications are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a LAN card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the Internet 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for configuring a monitoring system to monitor selected network elements as described herein. Processor 404 may execute the received code as it is received and/or stored in storage device 410 or other non-volatile storage for later execution. In this manner, computer system 400 may obtain application code in the form of a carrier wave.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A computer-implemented method for printing an electronic document, the method comprising:

displaying a user interface that comprises user interface elements through which a user can specify, for each particular copy of two or more printed copies of an electronic document, a different source tray from which media for printing that particular copy is to be drawn, wherein the user interface concurrently displays at least a first user interface element that accepts an identification of a first source tray from the user and a second user interface element that accepts an identification of a second source tray from the user;

receiving, through the user interface, an identification that at least a first copy of the two or more printed copies of the electronic document are to be printed using media drawn from a first source tray and that at least a second copy of the two or more printed copies of the electronic document are to be printed using media drawn from a second source tray that is different than the first source tray;

in response to receiving, through the user interface, the identification that at least the first copy of the two or more printed copies of the electronic document is to be printed using media drawn from the first source tray and that at least the second copy of the two or more printed copies of the electronic document is to be printed using media drawn from the second source tray that is different than the first source tray, generating a single print job that specifies that at least the first copy of the two or more printed copies of the electronic document is to be printed using media drawn from a first source tray and that at least the second copy of the two or more printed copies of the electronic document is to be printed using media drawn from the second source tray that is different than the first source tray; and sending the single print job to a printing device, wherein processing of the single print job at the printing device causes the printing device to print at least the first copy of the two or more printed copies of the electronic document using the media drawn from the first source tray, and to print at least the second copy of the two or more printed copies of the electronic document using the media drawn from the second source tray that is different than the first source tray.

2. The computer-implemented method of claim 1, further comprising displaying on the user interface one or more user interface elements that allow user to specify, through the one or more user interface elements, different output trays into which separate printed copies of the two or more printed copies of the electronic document are to be deposited.

3. The computer-implemented method of claim 1, wherein the user interface comprises, for each copy of the two or more printed copies of the electronic document, a separate set of user interface elements, wherein each set of user interface elements comprises at least (a) a user interface element through which a user can specify a source tray for the copy and (b) a user interface element through which a user can specify an output tray for the copy, wherein a user can specify a different source tray and a different output tray for each copy of the two or more printed copies of the electronic document.

4. The computer-implemented method of claim 1, wherein program code for displaying the user interface is contained in a printer driver that can be invoked by multiple applications.

5. The computer-implemented method of claim 1, further comprising:
receiving, through the user interface, an indication of a number of printed copies of the electronic document.

6. The computer-implemented method of claim 1, wherein displaying the user interface comprises displaying the user interface in response to an activation of a print control of an application, wherein all handling characteristics for all of the printed copies of the two or more printed copies can be specified after only a single activation of the print control.

7. A computer-implemented method for specifying handling characteristics for an electronic document, the computer-implemented method comprising:
in response to a user's activation of a print control of an application program, displaying, to the user, a user interface that comprises:
a first user interface element through which the user can select, from among a plurality of source trays of a printing device, a first source tray of the printing device;
a second user interface element through which the user can select, from among a plurality of output trays of the printing device, a first output tray of the printing device;
a third user interface element through which the user can select, from among the plurality of source trays of the printing device, a second source tray of the printing device, wherein the second source tray is separate from the first source tray;
a fourth user interface element through which the user can select, from among the plurality of output trays of the printing device, a second output tray of the printing device, wherein the second output tray is separate from the first output tray, wherein the first, second, third, and fourth user interface elements are displayed concurrently;
receiving, through the user interface, an indication that at least a first printed copy of the electronic document is to be printed on media from the first source tray and is to be deposited in the first output tray and that at least a second printed copy of the electronic document is to be printed on media from the second source tray and is to be deposited in the second output tray;
in response to receiving, through the user interface, the indication that at least the first printed copy of the electronic document is to be printed on media from the first source tray and is to be deposited in the first output tray and that at least the second printed copy of the electronic document is to be printed on media from the second source tray and is to be deposited in the second output tray, generating a single print job that specifies that at least the first printed copy of the electronic document is to be printed on media from the first source tray and is to be deposited in the first output tray and that at least the second printed copy of the electronic document is to be printed on media from the second source tray and is to be deposited in the second output tray; and
sending the single print job to a printing device, wherein processing of the single print job at the printing device causes the printing device to print at least the first printed copy of the electronic document on the media from the first source tray and to be deposited in the first output tray and to print at least the second printed copy of the electronic document on the media from the second source tray and to be deposited in the second output tray.

8. A non-transitory computer-readable medium storing instructions for printing an electronic document, wherein processing of the instructions by one or more processors causes:
displaying a user interface that comprises user interface elements through which a user can specify, for each particular copy of two or more printed copies of an electronic document, a different source tray from which media for printing that particular copy is to be drawn, wherein the user interface concurrently displays at least a first user interface element that accepts an identification of a first source tray from the user and a second user interface element that accepts an identification of a second source tray from the user;
receiving, through the user interface, an identification that at least a first copy of the two or more printed copies of the electronic document are to be printed using media drawn from a first source tray and that at least a second copy of the two or more printed copies of the electronic document are to be printed using media drawn from a second source tray that is different than the first source tray;
in response to receiving, through the user interface, the identification that at least the first copy of the two or more printed copies of the electronic document is to be printed using media drawn from the first source tray and that at least the second copy of the two or more printed copies of the electronic document is to be printed using media drawn from the second source tray that is different than the first source tray, generating a single print job that specifies that at least the first copy of the two or more printed copies of the electronic document is to be printed using media drawn from a first source tray and that at least the second copy of the two or more printed copies of the electronic document is to be printed using media drawn from the second source tray that is different than the first source tray; and
sending the single print job to a printing device, wherein processing of the single print job at the printing device causes the printing device to print at least the first copy of the two or more printed copies of the electronic document using the media drawn from the first source tray, and to print at least the second copy of the two or more printed copies of the electronic document using the media drawn from the second source tray that is different than the first source tray.

9. The non-transitory computer-readable medium of claim 8, further comprising displaying on the user interface one or more user interface elements that allow a user to specify, through the one or more user interface elements, different output trays into which separate printed copies of the two or more printed copies of the electronic document are to be deposited.

10. The non-transitory computer-readable medium of claim 8, wherein the user interface comprises, for each copy of the two or more printed copies of the electronic document, a separate set of user interface elements, wherein each set of user interface elements comprises at least (a) a user interface element through which a user can specify a source tray for the copy and (b) a user interface element through which a user can specify an output tray for the copy, wherein a user can specify a different source tray and a different output tray for each copy of the two or more printed copies of the electronic document.

11. The non-transitory computer-readable medium of claim 8, wherein program code for displaying the user interface is contained in a printer driver that can be invoked by multiple applications.

12. The non-transitory computer-readable medium of claim 8, further comprising additional instructions which, when processed by the one or more processors, causes
receiving, through the user interface, an indication of a number of printed copies of the electronic document.

13. The non-transitory computer-readable medium of claim 8, wherein displaying the user interface comprises displaying the user interface in response to an activation of a print control of an application, wherein all handling characteristics for all of the printed copies of the two or more printed copies can be specified after only a single activation of the print control.

14. A non-transitory computer-readable medium storing instructions for specifying handling characteristics for an electronic document, wherein processing of the instructions by one or more processors causes
in response to a user's activation of a print control of an application program, displaying, to the user, a user interface that comprises:
a first user interface element through which the user can select, from among a plurality of source trays of a printing device, a first source tray of the printing device;
a second user interface element through which the user can select, from among a plurality of output trays of the printing device, a first output tray of the printing device;
a third user interface element through which the user can select, from among the plurality of source trays of the printing device, a second source tray of the printing device, wherein the second source tray is separate from the first source tray;
a fourth user interface element through which the user can select, from among the plurality of output trays of the printing device, a second output tray of the printing device, wherein the second output tray is separate from the first output tray, wherein the first, second, third, and fourth user interface elements are displayed concurrently;
receiving, through the user interface, an indication that at least a first printed copy of the electronic document is to be printed on media from the first source tray and is to be deposited in the first output tray and that at least a second printed copy of the electronic document is to be printed on media from the second source tray and is to be deposited in the second output tray;
in response to receiving, through the user interface, the indication that at least the first printed copy of the electronic document is to be printed on media from the first source tray and is to be deposited in the first output tray and that at least the second printed copy of the electronic document is to be printed on media from the second source tray and is to be deposited in the second output tray, generating a single print job that specifies that at least the first printed copy of the electronic document is to be printed on media from the first source tray and is to be deposited in the first output tray and that at least the second printed copy of the electronic document is to be printed on media from the second source tray and is to be deposited in the second output tray; and
sending the single print job to a printing device, wherein processing of the single print job at the printing device causes the printing device to print at least the first printed copy of the electronic document on the media from the first source tray and to be deposited in the first output tray and to print at least the second printed copy of the electronic document on the media from the second source tray and to be deposited in the second output tray.

* * * * *

UNITED STATES PATENT AND TRADEMARK OFFICE
CERTIFICATE OF CORRECTION

| | | |
|---|---|---|
| PATENT NO. | : 7,876,464 B2 | Page 1 of 1 |
| APPLICATION NO. | : 11/343453 | |
| DATED | : January 25, 2011 | |
| INVENTOR(S) | : Athar Luqman Ahmad | |

It is certified that error appears in the above-identified patent and that said Letters Patent is hereby corrected as shown below:

In the Claims:

Claim 2, column 9, line 3 After "allow" insert -- a --

Claim 14, column 11, line 35 After "causes" insert -- : --

Signed and Sealed this
Twenty-ninth Day of March, 2011

David J. Kappos
*Director of the United States Patent and Trademark Office*